(12) United States Patent
Krishnamurthy et al.

(10) Patent No.: US 9,239,864 B2
(45) Date of Patent: Jan. 19, 2016

(54) DISTRIBUTING AND PROCESSING STREAMS OVER ONE OR MORE NETWORKS

(71) Applicant: Cisco Technology, Inc., San Jose, CA (US)

(72) Inventors: Saileshwar Krishnamurthy, Palo Alto, CA (US); Madhu Kumar, San Mateo, CA (US); Amit Bhat, Santa Clara, CA (US); Maciek Sakrejda, El Cerrito, CA (US); Robert Allen Lerche, Belmont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 248 days.

(21) Appl. No.: 13/865,054

(22) Filed: Apr. 17, 2013

(65) Prior Publication Data

US 2013/0275452 A1    Oct. 17, 2013

Related U.S. Application Data

(60) Provisional application No. 61/625,630, filed on Apr. 17, 2012.

(51) Int. Cl.
*G06F 17/30* (2006.01)
(52) U.S. Cl.
CPC .... *G06F 17/30445* (2013.01); *G06F 17/30516* (2013.01)
(58) Field of Classification Search
CPC ............... G06F 17/30445; G06F 17/30545; G06F 17/30675; G06F 17/30424; G06F 17/30516
See application file for complete search history.

(56) References Cited

U.S. PATENT DOCUMENTS

| | | | |
|---|---|---|---|
| 7,383,253 B1 * | 6/2008 | Tsimelzon et al. | 707/610 |
| 7,818,313 B1 * | 10/2010 | Tsimelzon et al. | 707/718 |
| 2002/0143728 A1 * | 10/2002 | Cotner et al. | 707/1 |
| 2007/0240061 A1 * | 10/2007 | Cormode et al. | 715/736 |
| 2009/0228434 A1 | 9/2009 | Krishnamurthy et al. | |
| 2009/0228465 A1 | 9/2009 | Krishnamurthy et al. | |
| 2011/0145828 A1 * | 6/2011 | Takahashi et al. | 718/102 |
| 2011/0302164 A1 * | 12/2011 | Krishnamurthy et al. | 707/737 |
| 2012/0078975 A1 * | 3/2012 | Chen et al. | 707/803 |
| 2013/0054567 A1 * | 2/2013 | Graefe | 707/714 |

OTHER PUBLICATIONS

"Shared Query Processing in Data Streaming Systems", by Saileshwar Krishnamurthy, Fall 2006, http://citeseerx.ist.psu.edu/viewdoc/download? Doi=10.1.1.122.1989&rep1&type=pdf.

(Continued)

*Primary Examiner* — Yuk Ting Choi
(74) *Attorney, Agent, or Firm* — Hickman Palermo Becker Bingham LLP

(57) ABSTRACT

In an embodiment, a method for distributing and processing streams over wide area networks comprises receiving, at a unified data processing node, a continuous query; determining a parallel portion of the continuous query; sending the parallel portion to a plurality of distributed data processing nodes located in a plurality of data centers; at each distributed node in the plurality of distributed nodes, locally executing the parallel portion against independent data partitions, producing a partial summary data, sending the partial summary data to the unified node; continuously receiving, at the unified node, in real-time, the partial summary data.

25 Claims, 6 Drawing Sheets

(56) References Cited

OTHER PUBLICATIONS

Altinel, Mehmet et al. "Cache Tables: Paving the Way for an Adaptive Database Cache." Proceedings of the 29th VLDB Conference. Berlin. Germany. 2003.

Franklin, Michael J. et al. "Design Considerations for High Fan-in Systems: the HiFi Approach." Proceedings of the 2nd CIDR Conference, Asilomar, California, 2005.

Krishnamurthy, Sailesh et al. "On-the-Fly Sharing for Streamed Aggregation." SIGMOD Conference 2006, Chicago, Illinois, Jun. 27-29, 2006.

Krishnamurthy, Sailesh et al. "The Case for Precision Sharing." Proceedings of the 30th VLDB Conference, Toronto, Canada, 2004.

Krishnamurthy, Sailesh et al. "Shared Hierarachical Aggregation for Monitoring Distributed Streams." Report No. UCB/CSD-05-1381. Computer Science Division, University of California, Berkeley, Oct. 18, 2005.

Chandrasekaran, Sirish et al. "TelegraphCQ: Continuous Dataflow Processing for an Uncertain World." Proceedings of the 1st CIDR Conference, Asilomar, California, 2003.

Krishnamurthy, Sailesh et al. "Telegraph CQ: An Architectural Status Report." Bulletin of the IEEE Computer Society Technical Committee on Data Engineering, Nov. 18, 2003.

Exploiting Punctuation Semantics in Continuous Data Streams, by Peter A. Tucker, David Maier, Tim Sheard and Leonidas Fegaras; IEEE Transaction on Knowledge and Data Engineering, v.15 n.3, p. 555-568, Mar. 2003; http://ieeexplore.ieee.org/stamp/stamp.jsp?tp=&arnumber=1198390.

Blocking Operators and Punctuated Data Streams in Continuous Query Systems, A report submitted by Anu Nalamwar in partial satisfaction for the MS degree in Computer Science, UCLA, Feb. 1, 2003; http://wis.cs.ucla.edu/wis/atlas/publications/stream_punctuation.pdf.

A Heartbeat Mechanism and its Applications in Gigascope, by Theodore Johnson, S. Muthukrishnan, Vladislav Shkapenyuk, and Oliver Spatscheck; Proceedings of the 31st VLDB Conference, Tronheim, Norway, 2005; p. 1079-1088; http://delivery.acm.org/10.1145/1090000/1083716/p1079-johnson.pdf?ip=151.207.250.21&acc=ACTIVE%20SERVICE&key=986B26D8D17D60C8AAC6AC.

U.S. Appl. No. 12/398,944, filed Mar. 5, 2009, Final Office Action, Mar. 29, 2013.

U.S. Appl. No. 12/398,944, filed Mar. 5, 2009, Office Action, Oct. 4, 2012.

U.S. Appl. No. 13/344,559, filed Jan. 5, 2012, Office Action, Jun. 13, 2012.

\* cited by examiner

DISTRIBUTING AND PROCESSING STREAMS OVER ONE OR MORE NETWORKS

BENEFIT CLAIM

This application claims the benefit under 35 U.S.C. §119 (e) of application 61/625,630, filed Apr. 17, 2012.

TECHNICAL FIELD

The present disclosure relates to management of computer networks including network management databases relating to analytics. The disclosure relates more specifically to techniques for processing continuous queries of network management data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Data communication networks may comprise a hierarchy of nodes that may each receive, process, and send unbounded, streaming data. A data stream may include a large amount of data per second. Furthermore, when a node in the network, which takes data from the input data stream as input, is suspended, intentionally or unintentionally, the node may lose input data while the node is suspended. Further still, in some cases multiple data streams may be received simultaneously.

Some systems may attempt to distribute processing of a data stream query across nodes within a network. An administrator may increase or decrease the number of nodes processing the query by stopping all processing across all the nodes, increasing the number of nodes, and subsequently restarting all the nodes. Stopping and starting nodes can be time consuming. Thus, data in the input streams may be missed while an administrator attempts to increase or decrease the number of nodes processing a data stream.

DETAILED DESCRIPTION

Figure 1:
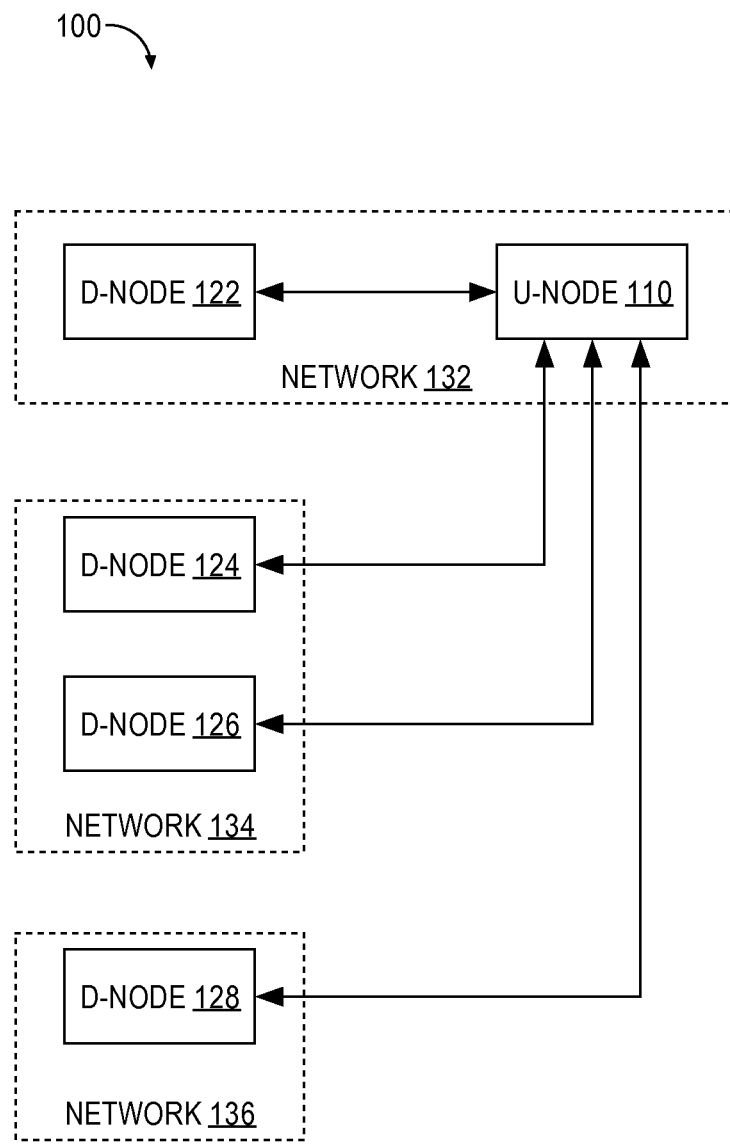
FIG. 1 illustrates a system that may execute one or more continuous queries, in one example embodiment.

Techniques for distributing and processing independent data streams over one or more networks are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Process Overview
   3.1 Live Propagation
   3.2 Summary Replication
   3.3 Suspending and Resuming Distributed Nodes
   3.4 Executing the Serial Portion
4.0 Multiple Parallel Portions
   4.1 Suspending and Resuming a Distributed Node Running Multiple Parallel Portions
5.0 Implementation Mechanisms—Hardware Overview
6.0 Extensions and Alternatives 1.0 Overview In an embodiment, a method for distributing and processing streams over wide area networks comprises receiving, at a unified data processing node, a continuous query; determining a parallel portion of the continuous query; sending the parallel portion to a plurality of distributed data processing nodes located in a plurality of data centers; at each distributed node in the plurality of distributed nodes, locally executing the parallel portion against independent data partitions, producing a partial summary data, and sending the partial summary data to the unified node; continuously receiving, at the unified node, in real-time, the partial summary data. A serial portion of the continuous query may also be determined, and the unified node that executes the serial portion may use as input the partial summary data for each distributed node. The continuous query may be directed to unbounded continuous streaming data.

In other embodiments, the invention encompasses a computer apparatus and a computer-readable medium configured to carry out the foregoing steps.

2.0 Structural and Functional Overview

A node, which may be a software module, a device, a computer, router, switch, or other element of internetworking infrastructure, or a computer component, may be processing a continuous query or portion of a continuous query. A continuous query is a query for data, including a query against a database, which defines one or more functions to perform on streaming input data. A continuous query need not be executed without interruption or downtime, examples of which are discussed below. A continuous query may be defined by a query language, such as a structured query language or a continuous query language. A continuous query can be issued either as, or as part of, a database query or a data definition language command. The one or more functions defined by a continuous query may be database specific functions, networking functions, analytic functions, multimedia functions, or any other streaming data functions. For example, a continuous query may specify summarizing, aggregating, or filtering network analytics data in a network management application. Furthermore, a continuous query may include a window interval or periodic interval, which may define the frequency at which derived results are sent to subsequent nodes, storage, memory, or other continuous queries. The continuous query may wait for data to arrive, in order to processes the data, and then output the derived, processed data. The features and processes discussed herein may be used for various purposes, such as: streaming analytic data, debugging and diagnostics, recovery from failures, as well as in storing and processing previously received streaming data.

A unified node may receive a continuous query. The unified node may determine a parallel portion and a serial portion of the continuous query. The unified node may disseminate the parallel portion to distributed nodes. Furthermore, a unified node may receive partial summary results from the distributed nodes executing the parallel portion and combine the partial summary results according to the serial portion.

A distributed node receives and executes the parallel portion of a continuous query and generates partial summary results using as input one or more independent data streams. For example, a distributed node may comprise a network management station that is configured to analyze analytics data. Additionally, a unified node may also be a distributed node. Additionally or alternatively, distributed nodes and unified nodes may be in a hierarchical structure comprising multiple levels of distributed nodes.

An independent data stream may be a stream of data that is not duplicated or processed by another node. For example, an independent data stream may comprise analytics data relating to packet processing in a network element, such as a distributed node that is also a router. The amount of data, however, in partial summary results may be substantially less than the raw data received from the independent data stream. For example, the raw data in an independent data stream may include hypertext transfer protocol ("HTTP") requests to a particular server. The partial summary results for a particular parallel portion of a continuous query, however, may be the number of requests made to a particular server over a particular amount of time.

FIG. 1 illustrates a system that may execute one or more continuous queries, in one example embodiment. While FIG. 1 illustrates one embodiment for purposes of illustrating a clear example, other embodiments may omit, add to, reorder, and/or modify any of the elements shown. In the embodiment illustrated in FIG. 1, system 100 includes U-node 110; D-nodes 122, 124, 126, and 128; and networks 132, 134, and 136.

U-node 110 is a unified node that may receive a continuous query, determine a parallel portion and a serial portion, distribute the parallel portion, and compute and return summary results based, at least in part, on the partial results returned from the distributed parallel portion. For example, U-node 110 may be a network management station, which is coupled to network 132 and coupled to D-nodes 122, 124, 126, and 128.

D-nodes 122, 124, 126, and 128 are distributed nodes. For example, D-node 122 may be a software module running on a router on network 132, D-nodes 124 and 126 may also be software modules running on routers on network 134, and D-node 128 may be a software module running on a router on network 136. D-nodes 122, 124, 126, and 128 may each receive the parallel portion of the continuous query from U-node 110 and return partial summary results to U-node 110.

In another embodiment, multiple unified nodes may be in one or more networks. In still other embodiments, each network may have a unified node. In yet other embodiments, each distributed node may have a corresponding unified node. In still another embodiment, all unified and distributed nodes may be located within a single network. Any node described herein as a software module also may be implemented using one or more processors, appliances, combinations of processors and firmware, or other digital data processing hardware elements.

3.0 Process Overview

Figure 2:
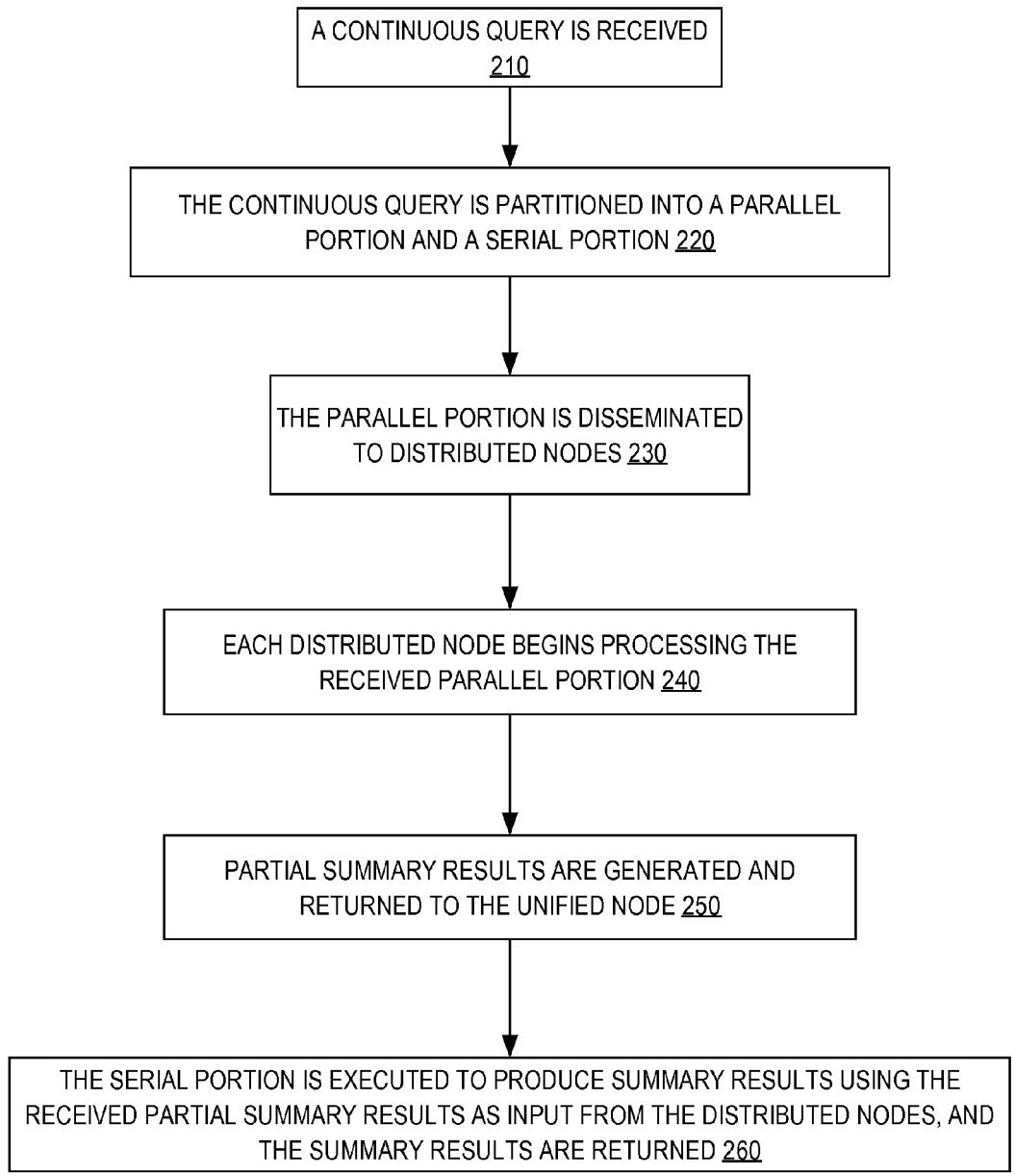
FIG. 2 illustrates a process for processing a continuous query on a plurality of networks comprising a unified node and a plurality of distributed nodes, in one example embodiment.

FIG. 2 illustrates a process for processing a continuous query on a plurality of networks comprising a unified node and a plurality of distributed nodes, in one example embodiment. While FIG. 2 illustrates example steps according to an embodiment, other embodiments may omit, add to, reorder, and/or modify any of the steps shown. For purposes of illustrating a clear example, FIG. 2 may be described using the embodiment illustrated in FIG. 1. However, other embodiments may use other arrangements of unified nodes, distributed nodes, and networks. Referring now to FIG. 2, in step 210, a continuous query is received. For example, U-node 110 receives a continuous query from a user, computer, system, process, or service. As a specific example, for purposes of illustrating one possible use of the process, assume the continuous query is directed to calculating the average throughput, per second, over consecutive five-second windows, for connected networks 132, 134, and 136.

In step 220, the continuous query is partitioned into a parallel portion and a serial portion. For example, U-node 110 may determine based, at least in part, on the definition of the continuous query, a serial portion and a parallel portion. For purposes of illustrating a clear example, assume that U-node 110 determines that the parallel portion instructs each distributed node to calculate the average throughput, per second, over consecutive five-second windows on its respective network or sub-network.

In step 230, the parallel portion is sent or disseminated to distributed nodes. For example, U-node 110 may send the parallel portion by pushing a copy of the parallel portion to D-nodes 122, 124, 126, 128. U-node 110 may be aware of, and have access to, D-nodes 122, 124, 126, 128 based on configuration data or manual notification. Manual notification of distributed nodes may include a continuous query that identifies particular distributed nodes, or a database or repository of distributed nodes maintained by a unified node and/or a user. However, routers, firewalls, or other network devices or protocols may prevent U-node 110 from pushing the parallel portion to one of the D-nodes 122, 124, 126, or 128. For example, network 136 may be owned by a third party and may be a third party intranet with a firewall that prevents unsolicited inbound queries or requests. Therefore, one or more of D-nodes 122, 124, 126, or 128 may poll U-node 110 for new parallel portions to execute.

Polling may also provide a mechanism for parallel portions to be sent to distributed nodes that U-node 110 is not currently aware of. "Aware," in this context, means storing, accessing or obtaining data indicating an identity or location. For example, assume U-node 110 is not currently aware of D-node 128 or network 136, which D-node 128 is connected to. Although U-node 110 is not initially aware of D-node 128, or network 136, U-node may become aware of both D-node 128 and network 136 when D-node 128 polls U-node 110. Thus, system 100 need not be constrained to the distributed nodes of which U-node 110 is aware. As new distributed nodes are brought online and poll U-node 110, system 100 may expand without disrupting or resetting currently executing queries.

In step 240, each distributed node begins processing the received parallel portion. For example, upon receiving the parallel portion, each of D-nodes 122, 124, 126, 128 may synchronously, or asynchronously, begin calculating the average throughput, per second, over consecutive five-second windows on each distributed node's respective network or sub-network. Although D-node 124 and D-node 126 are both located on network 134, in this example D-node 124 may calculate the throughput observed on a sub-network of network 134 for which D-node 124 may be responsible. Likewise, D-node 126 may calculate the throughput observed on another sub-network of network 134 for which D-node 126 may be responsible.

Additionally, a distributed node may retain at least a subset of the independent data stream it receives. Thus, a distributed node may begin processing a parallel portion with previously stored data from the independent data stream. For example, the definition of the parallel portion may instruct a distributed node to process the data from a particular timestamp, or time range. The definition of the parallel portion may further instruct a distributed node to process the data from the particular timestamp, or time range, before processing live streaming data from the independent data stream.

In step 250, partial summary results are generated and returned to the unified node. For example, at the end of each five-second interval, each of the D-nodes 122, 124, 126, 128 may return the partial summary results to U-node 110. Partial summary results may be returned by either live propagation or summary replication. Other methods of returning partial summary results may also be used.

3.1 Live Propagation

Live propagation returns results in a window-by-window fashion. As a specific example, assume that a unified node determines a parallel portion, which instructs each distributed node that receives the parallel portion to calculate the average throughput, per second, over consecutive five-second windows on the distributed node's respective network or sub-network. Therefore, in this example, each window is five seconds long. At the end of each five-second window, partial summary results are returned to the unified node.

In a system using live propagation, the summary results need not be persistently stored. For example, the summary results for a particular window need not depend on previous windows. Also for example, a subsequently received parallel portion may not depend on the partial summary results generated from a parallel portion currently being executed. Thus, the partial summary results for a particular window need not be persistently stored on the distributed node. Furthermore, a distributed node need not ensure that the partial summary results for a particular window were received by a unified node. As a specific example, assume a dashboard application is a unified node that calculates the summary result of the most recent window. Also assume that the summary result for a particular window is the sum of the partial summary results from each distributed node for the particular window. Furthermore, assume the dashboard does not display the historical results from previous windows. If the partial summary results from a distributed node are not received for the particular window, the summary results for the particular window may be affected, but other windows, including subsequent windows, may not be affected. Accordingly, the distributed nodes need not determine whether the partial summary results for each window are received by the unified node.

Figure 3:
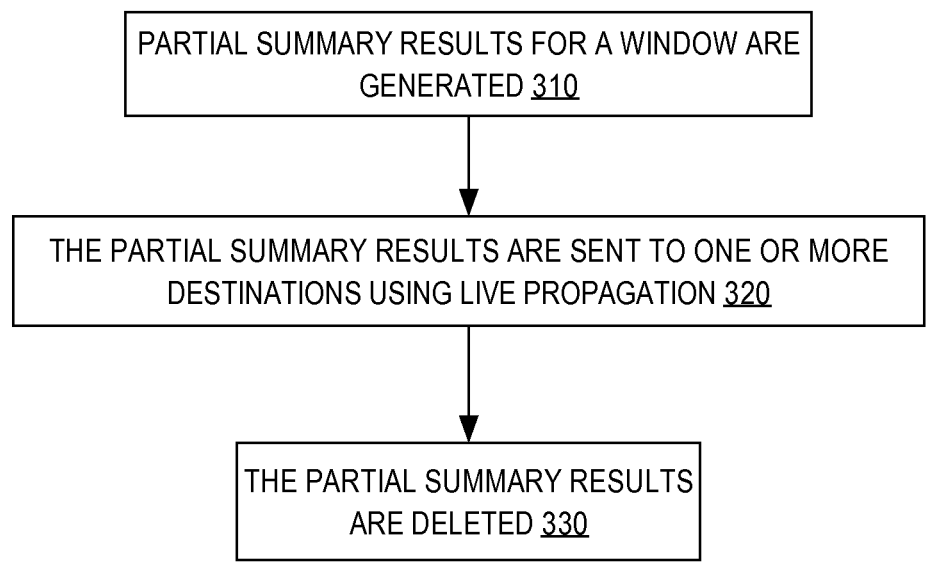
FIG. 3 illustrates a process for generating and returning partial summary results to a unified node using live propagation, in one example embodiment.

FIG. 3 illustrates a more detailed process for generating and returning partial summary results to a unified node, in steps 240 and 250, using live propagation, in one example embodiment. While FIG. 3 illustrates example steps according to an embodiment, other embodiments may omit, add to, reorder, and/or modify any of the steps shown. For purposes of illustrating a clear example, FIG. 3 may be described using the embodiments illustrated in FIG. 1. Referring now to FIG. 3, in step 310, partial summary results for a window are generated. For example, D-node 128 may determine the average throughput per second for a first five-second window. D-node 128 may store the results for the first five-second window in a buffer in a cache, memory, or disk.

In step 320, the partial summary results are sent to one or more destinations using live propagation. For example, D-node 128 or a background process may retrieve the partial summary results for the first five-second window and send the results to U-node 110. Alternatively or additionally, the same process that generates the partial summary results for the first five-second window also sends the partial summary results to U-node 110. U-node 110 may be designated as the recipient of the partial summary results in the parallel portion that D-node 128 is executing. Alternatively, U-node 110 may be the implied intended recipient since the parallel portion D-node 128 is executing was received from U-node 110. Alternatively or additionally, D-node 128 may maintain an open connection to U-node 110, and D-node 128 may write partial summary results directly to U-node 110 through the connection.

Furthermore, the partial summary results may be copied to other destinations. Other destinations may include one or more unified nodes, distributed nodes, or other software modules or devices. For example, assume a second unified node is running on a network of system 100. The partial summary results generated by D-node 128 may also be sent to the second unified node in order to prevent having a single point of failure. Also for example, a software application may be identified in the definition of the parallel portion as a recipient. Thus, D-node 128 may also send a copy the partial summary results to the software module.

Additionally or alternatively, other recipients may query a distributed node for partial summary results. For example, a second software application may issue a fetch command to D-node 128 to receive the partial summary results of a parallel portion. Thus, D-node 128 may also copy the partial summary results to the second software application.

Additionally or alternatively, recipients may be determined based on policy constraints. For example, a sovereign state may require that data generated within a network located within the sovereign state must remain may not be sent outside the sovereign state.

In step 330, the partial summary results are deleted. For example, the background process discussed in step 320, which distributes the partial summary results, may also delete the partial summary results after distributing the partial summary results to all the intended recipients. Alternatively, the partial summary results may be stored in a buffer and deleted after a particular amount of time or a threshold amount of memory has been used.

3.2 Summary Replication

Summary replication returns results in a transactional run-by-run fashion. As a specific example, assume that a unified node determines a parallel portion, which instructs each distributed node that receives the parallel portion to calculate the throughput per minute on the distributed node's respective network or sub-network. Therefore, in this example, each run is one minute long. The run is sent from the distributed node to the unified node using a transactional-based system. Thus, all or none of the partial summary results for a run is guaranteed to be received by the unified node.

In a system using summary replication, the summary results for a particular run may depend on the partial summary results generated from previous runs. For example, a subsequently received parallel portion may depend on the partial summary results generated from a parallel portion currently being executed. Thus, the partial summary results for a particular run may be persistently stored on a distributed node, at least until the distributed node has confirmed that the unified node has received the partial summary results for the particular run. As a specific example, assume an application is a unified node that calculates summary results. Also assume that the summary results are based, at least in part, on the sum of the partial summary results for a particular run and one or more previous runs. Thus, if the partial summary data from a distributed node is not received for a particular run, the summary results for the particular run may be affected, and other summary results for subsequent runs may also be affected. Accordingly, distributed nodes may determine whether the partial summary results for each run are received by the unified node before purging the partial summary results for a run. Additionally or alternatively, after a distributed node sends partial summary results, the distributed node may query the recipient to ensure the receipt did receive the partial summary results. Also additionally or alternatively, before sending partial summary results to an intended recipient, a distributed node may query the recipient to determine if the intended receipt has already received the partial summary results.

Figure 4:
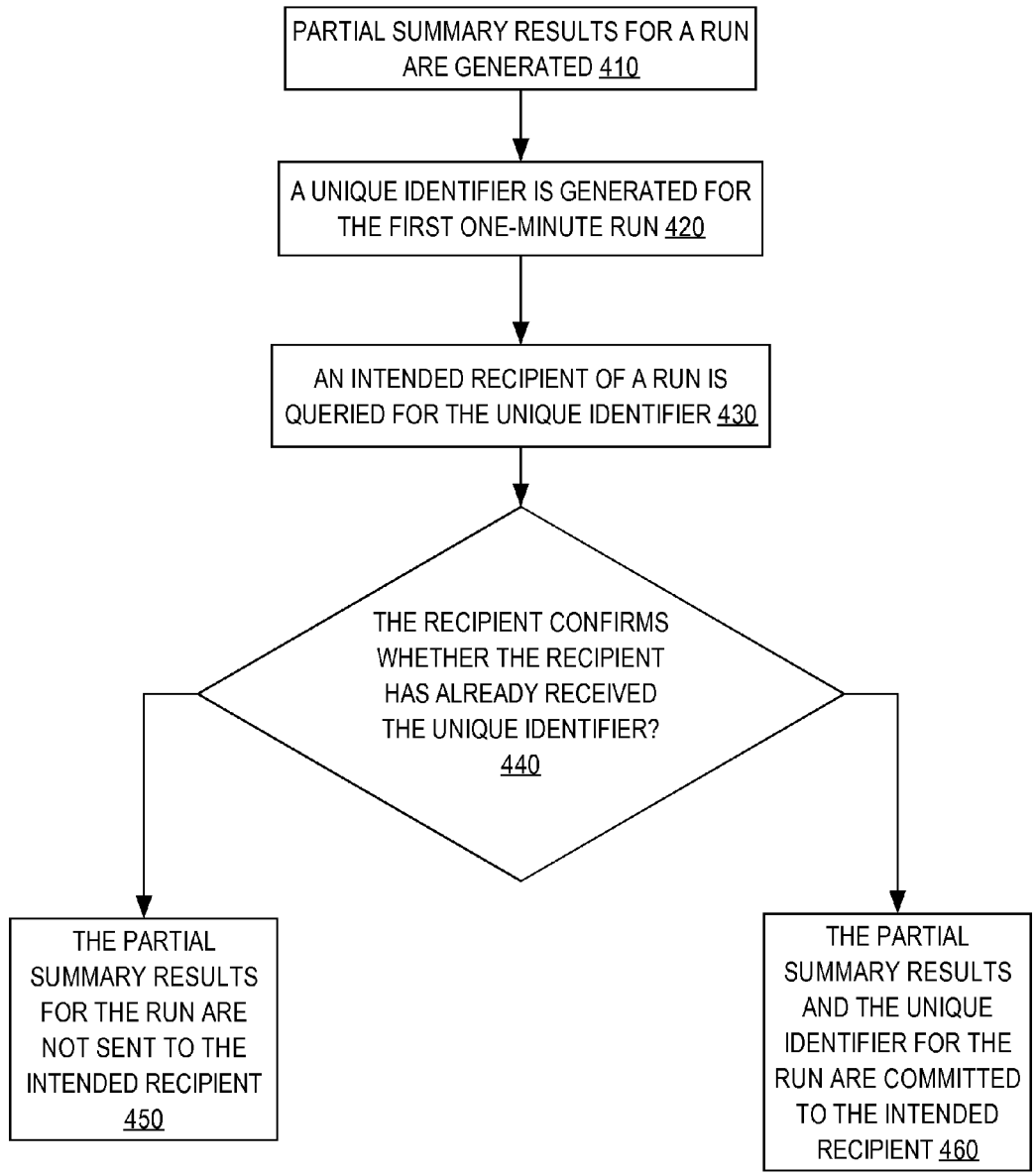
FIG. 4 illustrates a process for generating and returning partial summary results to a unified node using summary replication, in one example embodiment.

FIG. 4 illustrates a more detailed process for generating and returning partial summary results to a unified node, in steps 240 and 250, using summary replication, in one example embodiment. While FIG. 4 illustrates example steps according to an embodiment, other embodiments may omit, add to, reorder, and/or modify any of the steps shown. For purposes of illustrating a clear example, FIG. 4 may be described using the embodiments illustrated in FIG. 1. Referring now to FIG. 4, in step 410, partial summary results for a run are generated. For example, D-node 128 may calculate the throughput for a first one-minute run. D-node 128 may store the results for the first one-minute run in a buffer in a cache, memory, or disk.

In step 420, a unique identifier is generated for the first one-minute run. For example, the partial summary results for the first one-minute run may be associated with a timestamp and an identifier for D-node 128, such as "1366002000-128."

In step 430, an intended recipient of a run is queried for the unique identifier. For example, D-node 128 may query U-node 110 for the unique identifier "1366002000-128". As discussed above, partial summary results may be intended for multiple recipients. Accordingly, step 430, and subsequent steps, may be repeated for each intended recipient.

In step 440, the recipient confirms whether the recipient has already received the unique identifier. For example, if U-node 110 confirms that U-node 110 has already received 1366002000-128, then control continues to step 450. Otherwise, control continues to step 460. U-node 128 may not have received the partial summary results associated with 1366002000-128 for many reasons including: U-node 110 temporarily went offline; D-node 128 temporarily went offline; network failure; or any other reason for which data may not be received.

In step 450, the partial summary results for the run are not sent to the intended recipient. For example, if U-node 110 returns 1366002000-128 indicating that U-node 110 has received the partial summary results, then the partial summary results for the run, associated with 1366002000-128, are not resent. Sending the partial summary results associated with 1366002000-128 may be a waste of bandwidth. Furthermore, U-node 110 may incorrectly compute the serial portion for a particular run if U-node 110 receives the same partial summary results twice. Other unwanted side effects may also occur.

In step 460, the partial summary results and the unique identifier for the run are committed to the intended recipient. For example, after determining that U-node 110 had not received the partial summary results for the run, in step 440, D-node 128 commits the partial summary results and the unique identifier for the run, 1366002000-128, to U-node 110. Additionally or alternatively, before D-node 128 purges the partial summary results associated with 1366002000-128, D-node 128 may determine that U-node 110 received the partial summary results.

3.3 Executing the Serial Portion

Referring again to FIG. 2, subsequent to step 250, in step 260, the serial portion is executed to produce summary results using the received partial summary results as input from the distributed nodes, and the summary results are returned. For example, U-node 110 receives the average throughput, per second, over a consecutive five-second window, of each network or sub-network, calculated by D-nodes 122, 124, 126, and 128. U-node 110 may then execute the serial results, which in this example calculates the total average throughput, per second, over a consecutive five-second window for the networks 132, 134, and 136. Accordingly, U-node 110 sums the partial summary results for each window. U-node 110 returns the total average throughput for each window to the user. As U-node 110 continues to receive partial summary results for each window from D-nodes 122, 124, 126, and 128, U-node 110 continues to sum the partial summary results for each window and return the summary results to the user. The summary results may be returned to the user using any of the methods already discussed above.

4.0 Multiple Parallel Portions

Distributed nodes may execute multiple parallel portions for one or more continuous queries. Furthermore, a first process executing a first parallel portion may use the output of a second, concurrently running process executing a second parallel portion. For example, a first process executing a first parallel portion may count the number of HTTP requests made every minute and a second process executing a second parallel portion may count the number of HTTP requests made every five minutes. The second process may count the number of HTTP requests made every five minutes by taking as input the partial summary results of the first process. Thus, the second parallel portion depends on the first parallel portion.

In an embodiment, a distributed node may determine that a second parallel portion depends on a first parallel portion. For example, the definition of the second parallel portion may identify the first parallel portion as an input source. If the first parallel portion is not being executed, the results generated from executing the second parallel portion may be incorrect. To continue with the previous example, if the process executing the second parallel portion assumes that the first parallel portion is being executed, but the first parallel portion is not being executed, the process executing the second parallel portion may incorrectly assume that no HTTP requests were made during the time the first parallel portion was not being executed.

4.1 Suspending and Resuming a Distributed Node Running Multiple Parallel Portions Distributed nodes may be suspended. For example, a distributed node may lose connectivity to the network which it resides, no longer be communicatively coupled with a unified node, lose power, or in some other way fail. Furthermore, a distributed node may be instructed to suspend processing by a network administrator or another user or process.

Distributed nodes may also resume. For example, a distributed node may resume processing in response to the distributed node recovering from a system malfunction, a network failure, or some other failure. Furthermore, a distributed node may resume processing after it is instructed to resume processing by a network administrator or other user or process.

Figure 5:
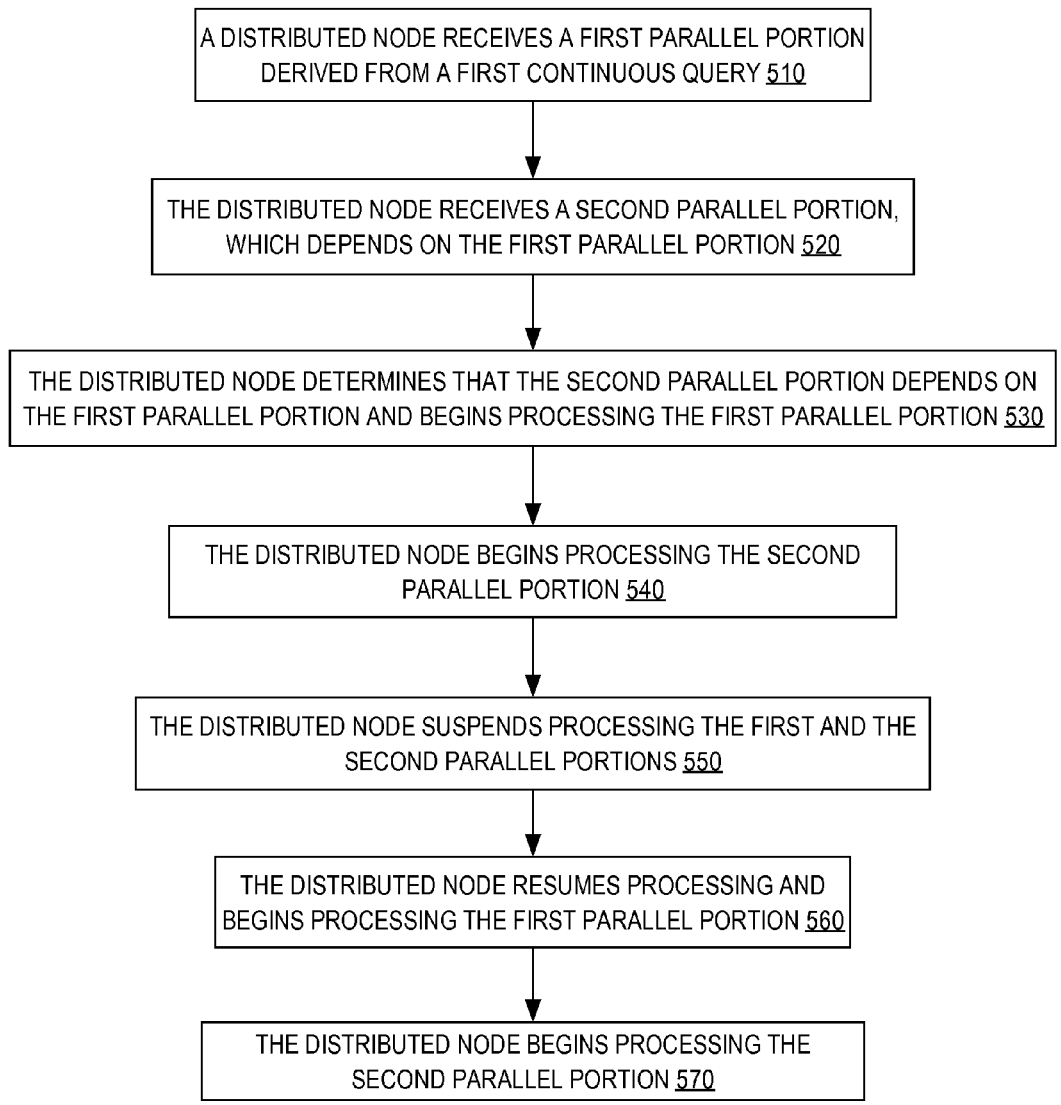
FIG. 5 illustrates a process for suspending and resuming a distributed node executing a first parallel portion and a second parallel portion, where the second parallel portion depends on the first parallel portion, in one example embodiment.

FIG. 5 illustrates a process for suspending and resuming a distributed node executing a first parallel portion and a second parallel portion, where the second parallel portion depends on the first parallel portion, in one example embodiment. While FIG. 5 illustrates example steps according to an embodiment, other embodiments may omit, add to, reorder, and/or modify any of the steps shown. For purposes of illustrating a clear example, FIG. 5 may be described using the embodiment illustrated in FIG. 1. However, other embodiments may use other arrangements of unified nodes, distributed nodes, and networks. Referring now to FIG. 5, in step 510, a distributed node receives a first parallel portion derived from a first continuous query. For example, D-node 128 may receive a first parallel portion from U-node 110. The first parallel portion may instruct D-node 128 to count the number of HTTP requests made every minute on network 136.

In step 520, the distributed node receives a second parallel portion, which depends on the first parallel portion. For example, D-node 128 may receive a second parallel portion from U-node 110. The second parallel portion may be derived from the first continuous query or may be derived from a second continuous query. The second parallel portion may instruct D-node 128 to count the number of HTTP requests made every five minutes on network 136. Alternatively, the second parallel portion may be received after a distributed node has already suspended processing.

In step 530, the distributed node determines that the second parallel portion depends on the first parallel portion and begins processing the first parallel portion. For example, the definition of the second parallel portion may indicate that the output generated from a process executing the first parallel portion should be used as the input for a process executing the second parallel portion. Thus, D-node 128 may determine that the second parallel portion depends on the first parallel portion and begins processing the first parallel portion. Alternatively, or additionally, D-node 128 may determine that the second parallel portion depends on the first parallel portion because the first parallel portion was received before the second parallel portion. Alternatively still, the definition of each parallel portion may include a sequence number that indicates an order in which the parallel portions should be processed.

In step 540, the distributed node begins processing the second parallel portion. For example, D-node 128 may begin processing the second parallel portion, using as input, the output generated from processing the first parallel portion.

In step 550, the distributed node suspends processing the first and the second parallel portions. For example, based on the load on network 132, D-node 128 may be instructed by a network administrator to suspend processing so that partial summary results stop streaming to U-node 110 on network 132. Accordingly, D-node 128 suspends processing both the first parallel portion and the second parallel portion. Additionally, D-node 128 may store the independent data stream so that upon resuming the parallel portions, the parallel portions may catch up to where processing would have been had processing not been suspended.

Alternatively, D-node 128 may be instructed to suspend processing of the first parallel portion. However, since D-node 128 has determined that the second parallel portion depends on the first parallel portion, D-node 128 may also suspend processing the second parallel portion.

Also alternatively, if D-node 128 is instructed to suspend processing the second parallel portion, but not the first parallel portion, then D-node 128 may continue to process the first parallel portion since the first parallel portion does not depend on the second parallel portion. Furthermore, since D-node 128 has determined that the second parallel portion depends on the first parallel portion, D-node 128 may store the partial summary results generated from processing the first parallel portion so that upon resuming the second parallel portion, the second parallel portion may catch up to where processing would have been had processing not been suspended.

Alternatively or additionally, a distributed or unified node may be designated as an archiving node. An archiving node may archive any data received from an independent data stream or generated as partial summary data. Thus, any continuous query, or portion of a continuous query, processed on an archiving node may begin processing from a previous point in time and catch up to live streaming data, before processing the live streaming data in real-time. In this context, receiving or processing in real-time means approximately near the time at which the partial summary data is produced, but does not imply or require an instantaneous or immediate occurrence.

In step 560, the distributed node resumes processing and begins processing the first parallel portion. For example, upon determining that the load on network 132 is substantially less than earlier, a network administrator may instruct D-node 128 to begin processing the first parallel portion and the second parallel portion. As in step 530, D-node 128 determines that the second parallel portion depends on the first parallel portion and therefore begins processing the first parallel portion first.

In step 570, the distributed node begins processing the second parallel portion. For example, D-node 128 may begin processing the second parallel portion, using as input, the output generated from processing the first parallel portion.

While the foregoing example discussed suspending and resuming multiple parallel portions executed on the same distributed node, a single parallel portion may also be suspended and resumed. For example, a distributed node that is processing a single parallel portion may suspend and resume processing of the single parallel portion.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
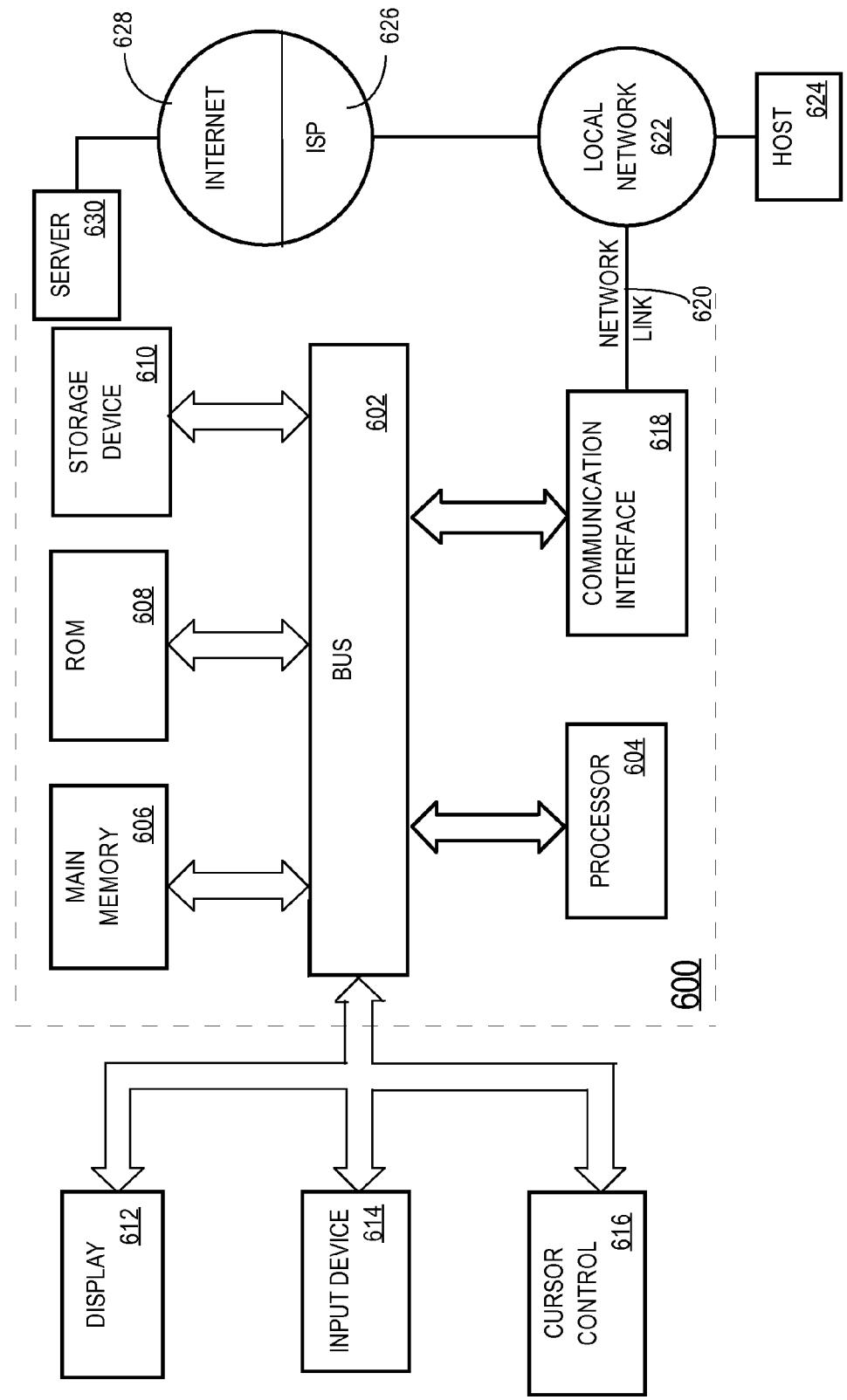
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving, at a unified data processing node, a continuous query;
determining a parallel portion of the continuous query;
sending the parallel portion to a plurality of distributed data processing nodes comprising at least a first distributed data processing node in a first data center and a second distributed data processing node in a second data center, wherein the first data center and the second data center are separate;
the first distributed data processing node locally processing the parallel portion against a first independent data stream to produce a first partial summary data, and sending the first partial summary data to the unified data processing node, wherein the first independent data stream is not duplicated or processed by the unified data processing node or the second distributed data processing node;
the second distributed data processing node locally processing the parallel portion against a second independent data stream to produce a second partial summary data, and sending the second partial summary data to the unified data processing node, wherein the second independent data stream is not duplicated or processed by the unified data processing node or the first distributed data processing node;
continuously receiving, at the unified data processing node, in real-time, streaming data results comprising the first partial summary data and the second partial summary data and combining the first partial summary data and the second partial summary data in preparation for returning combined streaming query results to an application; and
wherein the method is performed by one or more computing devices.

2. The method of claim 1 comprising:
determining a serial portion of the continuous query; and
executing, at the unified node, the serial portion using as input the first partial summary data and the second partial summary data.

3. The method of claim 1, comprising:
receiving, from at least one distributed node of the plurality of distributed nodes, a poll message requesting the parallel portion; and
in response to receiving the poll message, sending the parallel portion to the at least one distributed node.

4. The method of claim 1, comprising pushing the parallel portion to at least one distributed node of the plurality of distributed nodes.

5. The method of claim 1, wherein the distributed nodes are in a hierarchy of distributed nodes.

6. The method of claim 1, wherein the first data center and the second data center are in a hierarchy.

7. The method of claim 1, wherein the unified node is a first unified node in a plurality of unified nodes, and comprising sending a partial summary data for each distributed node in the plurality of distributed nodes to each unified node in the plurality of unified nodes.

8. The method of claim 1 comprising storing an archive of partial summary data of each distributed node.

9. The method of claim 1 comprising:
storing an identifier that identifies a portion of partial summary data received;
receiving an inquiry message, comprising the identifier, about whether the portion of partial summary data was received; and
sending a response indicating that the portion of partial summary data was received.

10. The method of claim 1, comprising receiving the continuous query directed to continuous streaming data.

11. The method of claim 1, wherein the parallel portion is a first parallel portion and further comprising:
determining a second parallel portion that depends on the first parallel portion;
sending the second parallel portion to the distributed nodes; and
at each distributed node of the distributed nodes, locally beginning execution of the first parallel portion before beginning execution of the second parallel portion.

12. The method of claim 11 comprising:
a node, of the distributed nodes, suspends processing; and
subsequently, the node resuming processing, wherein the node resumes execution of the first parallel portion before the node resumes execution of the second parallel portion.

13. A system comprising:
a unified node comprising a processor;
a plurality of distributed data processing nodes, each comprising a processor, the plurality of distributed data processing nodes comprising at least a first distributed data processing node in a first data center and a second distributed data processing node in a second data center, wherein the first data center and the second data center are separate;
wherein the unified node is configured to:
receive a continuous query;
determine a parallel portion of the continuous query;
send the parallel portion to at least the first and second distributed data processing nodes of the plurality of distributed data processing nodes; and
receive streaming data results comprising a first partial summary data and a second partial summary data in real-time and combine the first partial summary data and the second partial summary data in preparation for returning combined streaming query results to an application; and
wherein the first distributed data processing node in the plurality of distributed data processing nodes is configured to: processing the parallel portion against a first independent data stream to produce the first partial summary data, wherein the first independent data stream is not duplicated or processed by the unified data processing node or the second distributed data processing node; and send the first partial summary data to the unified node;
wherein the second distributed data processing node in the plurality of distributed data processing nodes is configured to: process the parallel portion against a second independent data stream to produce the second partial summary data, wherein the second independent data stream is not duplicated or processed by the unified data processing node or the first distributed data processing node; and send the second partial summary data to the unified node.

14. The system of claim 13 wherein the unified node is configured to:
determine a serial portion of the continuous query; and
execute the serial portion using as input the first partial summary data and the second partial summary data.

15. The system of claim 13 where the unified node is configured to:
receive, from at least one distributed node of the plurality of distributed nodes, a poll message requesting the parallel portion; and
in response to receiving the poll message, send the parallel portion to the at least one distributed node.

16. The system of claim 13 wherein the unified node is configured to push the parallel portion to at least one distributed node of the plurality of distributed nodes.

17. The system of claim 13, wherein the distributed nodes are configured in a hierarchy of distributed nodes.

18. The system of claim 13, wherein the first data center and the second data center are in a hierarchy.

19. The system of claim 13, wherein:
the unified node is a first unified node in a plurality of unified nodes; and
each distributed node of the distributed nodes is configured to send a partial summary data for the distributed node to each unified node in the plurality of unified nodes.

20. The system of claim 13 each distributed node of the distributed nodes is configured to store an archive of partial summary data of the distributed node.

21. The system of claim 13 wherein the unified node is configured to:
store an identifier that identifies a portion of partial summary data received;
receive an inquiry message, comprising the identifier, about whether the portion of the partial summary data was received; and
send a response indicating that the portion of partial summary data was received.

22. The system of claim 13 wherein the unified node is configured to receive the continuous query directed to continuous streaming data.

23. The system of claim 13, wherein:
the parallel portion is a first parallel portion;
the unified node is configured to:
determine a second parallel portion that depends on the first parallel portion; and
send the second parallel portion to the distributed nodes; and
each distributed node of the distributed nodes is configured to:
locally begin executing the first parallel portion before beginning to execute the second parallel portion.

24. The system of claim 23 wherein a node, of the distributed nodes, is configured to:
suspend processing; and
subsequently resume processing, wherein the node resumes execution of the first parallel portion before the node resumes execution of the second parallel portion.

25. One or more non-transitory computer-readable media storing one or more sequences of instructions which, when executed by one or more computing devices, cause:
receiving, at a unified data processing node, a continuous query;
determining a parallel portion of the continuous query;
sending the parallel portion to a plurality of distributed data processing nodes comprising at least a first distributed data processing node in a first data center and a second distributed data processing node in a second data center, wherein the first data center and the second data center are separate;
the first distributed data processing node locally processing the parallel portion against a first independent data stream to produce a first partial summary data, and sending the first partial summary data to the unified data processing node, wherein the first independent data stream is not duplicated or processed by the unified data processing node or the second distributed data processing node;
the second distributed data processing node locally processing the parallel portion against a second independent data stream to produce a second partial summary data, and sending the second partial summary data to the unified data processing node, wherein the second independent data stream is not duplicated or processed by the unified data processing node or the first distributed data processing node;
continuously receiving, at the unified data processing node, in real-time, streaming data results comprising the first partial summary data and the second partial summary data and combining the first partial summary data and the second partial summary data in preparation for returning combined streaming query results to an application.

* * * * *